Aug. 13, 1957 H. DE S. LAUVE 2,802,693
MAGNETIC ATTACHING MEANS FOR A SUNSHADE
Filed July 13, 1954
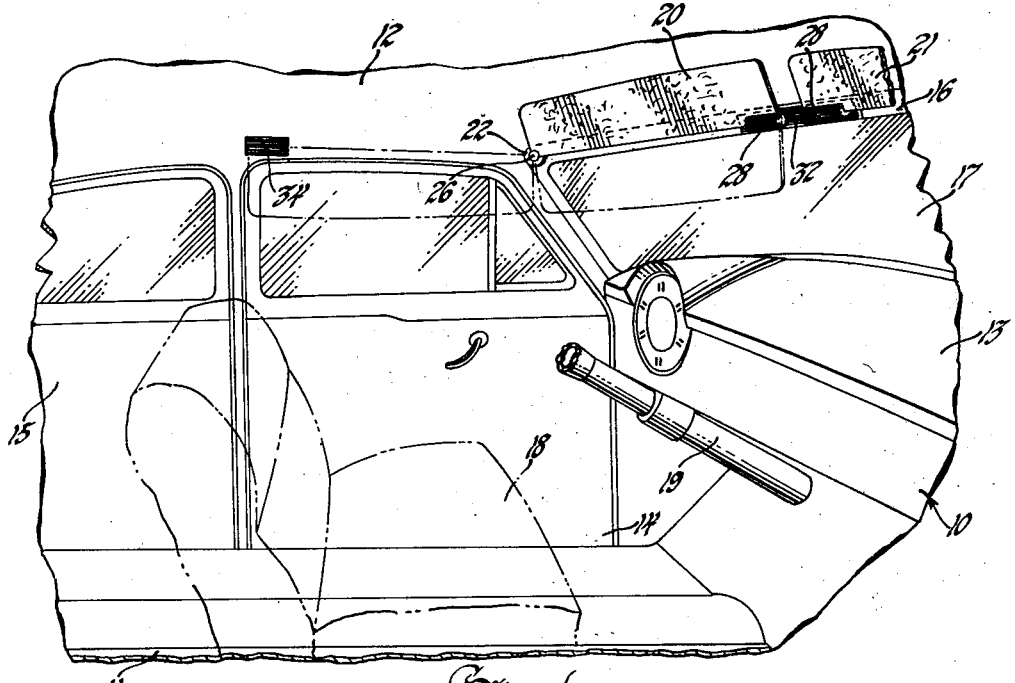
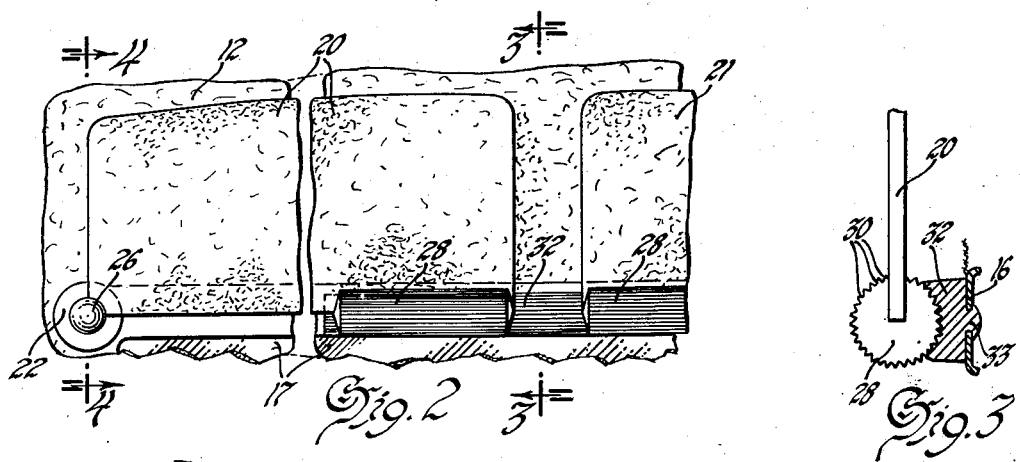
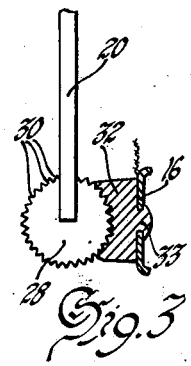
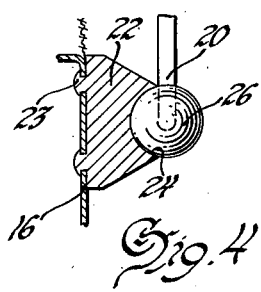
Inventor
Henry de S. Lauve
By Paul Fitzpatrick
Attorney

United States Patent Office 2,802,693
Patented Aug. 13, 1957

2,802,693
MAGNETIC ATTACHING MEANS FOR A SUNSHADE

Henry de S. Lauve, Grosse Pointe Woods, Mich., assignor to General Motors Corporation, Detroit, Mich., a corporation of Delaware Application July 13, 1954, Serial No. 442,970

5 Claims. (Cl. 296—97)

This invention relates to a sunshade assembly, and more particularly to magnetic attaching means for a sunshade.

One feature of the invention is that it provides improved sunshade attaching means; another feature of the invention is that it provides novel magnetic attaching means for a sunshade; a further feature of the invention is that magnetically attached ball and socket members provide a swivel mounting for one end of the sunshade on a vehicle body; still another feature of the invention is that magnetic means, comprising complementary gear and rack members, are provided for readily releasably holding the other end of the sunshade on the body for pivotal movement into a selected one of a plurality of positions; and yet a further feature of the invention is that the sunshade may be magnetically held in either of two locations on the body, the magnetic holding means including a toothed member on the sunshade and complementary toothed members on the front and side portions of the body.

Other features and advantages of the invention will be apparent from the following description and from the drawings, in which:

Fig. 1 is a fragmentary perspective view of the inside of an automobile body showing the novel sunshade attaching means, the sunshade being shown in one position in full lines and in other positions in broken lines;

Fig. 2 is a fragmentary elevational view of the sunshade and attaching means, the center portion of the sunshade being broken away;

Fig. 3 is a transverse section taken along the line 3—3 of Fig. 2; and

Fig. 4 is a transverse section taken along the line 4—4 of Fig. 2.

In most modern automobiles there is a sunshade mounted inside the vehicle body forwardly of the driver's seat and a similar sunshade mounted forwardly of the front passenger's seat. Each of these sunshades is movable from a retracted or out-of-the-way position where the sunshade lies adjacent the front roof portion of the car into a front operative position where the sunshade is turned down to cover a portion of the windshield or a side operative position where the sunshade covers a portion of the window in the front door. The sunshade may be tilted at a selected angle in either operative position, as desired by the operator.

In the past, sunshades of this general type have usually been held in inoperative position or at the desired angle in a selected operative position by frictional clamping means. After a period of use, it often happens that the frictional clamping means become loose so that the sunshade will not stay at a selected angle, and particularly slips pivotally down from its retracted position into the line of vision of the driver or passenger of the automobile.

This invention provides a novel and improved attaching means for a sunshade, whereby the sunshade is held by magnetic attaching means which provide a swivel mounting for one end of the sunshade and which readily releasably holds the other end of the sunshade on the body for pivotal movement into a selected one of a plurality of positions. This releasable holding means comprises complementary toothed magnetic members on the sunshade and on the body so that the sunshade may be held in retracted or operative position as desired and may be tilted to any desired angle in operative position and will be held at the selected angle. A second complementary toothed member is mounted on the body side wall above the door for cooperation with the member carried on the sunshade so that the sunshade can be magnetically held at a selected angle in a second operative position at the side of the automobile.

Referring now more particularly to the drawings, an automobile body designated generally as 10 includes a floor panel 11, a roof panel 12 and a dashboard 13. The edge portion of the roof panel 12, together with front and rear doors 14 and 15, form a side portion of the body, and a front portion of the body includes a windshield header bar 16 which extends transversely across the body at the front thereof above a windshield 17. Inside the body a front seat is shown at 18 and a steering column is shown at 19, the steering wheel being omitted in order to simplify the drawing.

In front of the driver's seat, there is a sunshade 20 and in front of the passenger's seat, there is a similar sunshade 21. Since these sunshades and their mounting means are similar, only the mounting means for the driver's sunshade 20 will be described.

The sunshade panel 20 may be of similar construction to sunshades which have been used in production in automobiles for many years. Magnetically attached ball and socket members provide a swivel mounting for the outer end of the sunshade. As shown best in Fig. 4, a socket member 22 is secured by peened studs 23 or the like to the header bar 16 at the front corner of the automobile body. A hemispherical socket 24 is formed in the member 22 and seats a generally spherical ball 26 which is mounted at the outside corner of the sunshade 20. The ball 26 is held in the socket by means of magnetic attraction. The ball and socket members may be permanent magnets, or only one of these members may be a permanent magnet and the other member may be formed of ferrous or other magnetic (but not permanently magnetized) material. The ball is held in the socket by magnetic attraction which permits pivotal and swiveling movement of the sunshade 20 so that the sunshade may be pivoted between a retracted position up against the roof panel 12 as shown in solid lines in Fig. 1, or the sunshade may be pivoted to a front operative position as shown in broken lines in Fig. 1 where the sunshade lies adjacent the window. If desired, the sunshade may be swivelly moved to a side operative position adjacent the door 14 shown in broken lines in Fig. 1.

At its inner or free end, the sunshade carries a cog or gear 28 which has notches 30 in its periphery as shown best in Fig. 3. This gear is nonrotatably mounted on the sunshade and is adapted to cooperate with an arcuate rack 32 mounted on the header bar 16 by means of a peened stud 33 (Fig. 3) or the like. The gear 28 and rack 32 are held together by magnetic attraction, at least one of these members being a permanent magnet and the other member (if not a permanent magnet) being of magnetic material, as described in connection with the ball and socket arrangement at the other end of the sunshade. Because of the cooperating notches in the gear and rack, the angle of the sunshade may be selected as desired to suit the operator, and the sunshade will be held in the selected position despite jars and vibrations encountered during operation of the automobile.

Preferably, rack 32 extends on opposite sides of the longitudinal center line of the automobile and is of such length that it cooperates with the gear member at the end of each of the sunshades 20 and 21. Secured to the side portion of the automobile adjacent the upper rear corner of the door 14, there is another rack 34 which is similar in transverse section to the rack 32 and which is adapted to cooperate with the gear 28 to hold the sunshade in an operative position at the side of the vehicle as shown in broken lines in Fig. 1. Again, the angle of the sunshade may be adjusted as desired, and the interfitting notches on the gear and rack will hold the sunshade in the selected position.

While I have shown and described one embodiment of my invention, it is capable of many modifications. Changes, therefore, in the construction and arrangement may be made without departing from the spirit and scope of the invention as set forth in the appended claims.

I claim:

1. In a vehicle body, apparatus of the character described, including: a sunshade; means providing a swivel mounting for one end of said sunshade on the body; and magnetic means comprising complementary magnetic gear and rack members for readily releasably holding the other end of said sunshade on said body for pivotal movement into a selected one of a plurality of positions.

2. In a vehicle body, apparatus of the character described, including: a sunshade; magnetically attached ball and socket members providing a swivel mounting for one end of said sunshade on the body; and magnetic means comprising complementary magnetic gear and rack members for readily releasably holding the other end of said sunshade on said body for pivotal movement into a selected one of a plurality of positions.

3. In a vehicle body, apparatus of the character described, including: a sunshade; means providing a swivel mounting for one end of said sunshade on the body; and magnetic means for readily releasably holding the other end of said sunshade on said body for pivotal movement into a selected one of a plurality of positions, comprising a toothed member on said other end of the sunshade and a complementary toothed rack member on the body, one of said members being a permanent magnet and the other member being formed of magnetic material.

4. In a vehicle body, apparatus of the character described, including: a sunshade; magnetically coupled ball and socket members providing a swivel mounting for one end of said sunshade on the body; and magnetic means for readily releasably holding the other end of said sunshade on said body for pivotal movement into a selected one of a plurality of positions, comprising a gear on said other end of the sunshade and a complementary toothed arcuate rack on the body.

5. In a vehicle body, apparatus of the character described, including: a sunshade; means providing a swivel mounting for one end of said sunshade on the body; and magnetic means for readily releasably holding the other end of said sunshade on said body in either of two locations for pivotal movement in either location to a selected angle, comprising a gear on said other end of the sunshade, a first complementary toothed arcuate rack on the front portion of the body, and a second complementary toothed arcuate rack on the side portion of the body.

References Cited in the file of this patent

UNITED STATES PATENTS

| | | |
|---|---|---|
| 179,764 | Briggs et al. | July 11, 1876 |
| 2,112,726 | Kemp et al. | May 29, 1938 |
| 2,153,095 | McKinley | Apr. 4, 1939 |
| 2,550,775 | Clark | May 1, 1951 |
| 2,561,923 | Harmon | July 24, 1951 |
| 2,603,530 | Jones | July 15, 1952 |
| 2,613,104 | Parsons | Oct. 7, 1952 |
| 2,695,950 | Zingone | Nov. 30, 1954 |